Patented Dec. 14, 1943

2,336,520

UNITED STATES PATENT OFFICE 2,336,520

DIOXAZINE-TYPE DYESTUFFS AND PROCESS FOR PREPARING THE SAME

Frithjof Zwilgmeyer, Wilmington, Del., assignor to E. I. du Pont de Nemours & Company, Wilmington, Del., a corporation of Delaware No Drawing. Application May 14, 1941, Serial No. 393,484

9 Claims. (Cl. 260—246)

This invention relates to novel dyestuff compounds suitable for dyeing cotton and other textiles, and to a process of preparing the same. More particularly, this invention deals with novel dioxazine-type dyestuffs which are obtainable by causing oleum, sulfuric acid or chloro-sulfonic acid to act upon a compound of the general formula

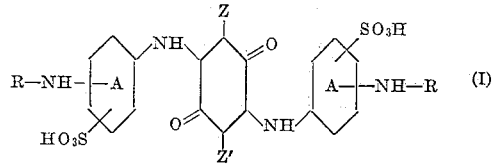

wherein each of the benzene radicals marked A has at least one free ortho-position, and wherein Z and Z' individually represent hydrogen, halogen or alkyl, while R is the radical of a 1,3-benzazole compound. By the expression a 1,3-benzazole compound I mean a compound of the group consisting of benzoxazole, benzthiazole, benzimidazole, and their various derivatives obtained by substitution in the homocyclic ring, in the heterocyclic ring or in both, including the various tautomers of these.

The treatment of the above type compound with oleum etc., results in closure of the two rings next to the central quinone radical, yielding a dioxazine dyestuff. This effect, however, is accompanied by sulfonation, and in the subsequent treatment of the product, some desulfonation or shifting of the $SO_3H$ groups takes place, as a result of which the formula of the final product is uncertain. The most that can be said about the final product is that it probably corresponds to the general formula

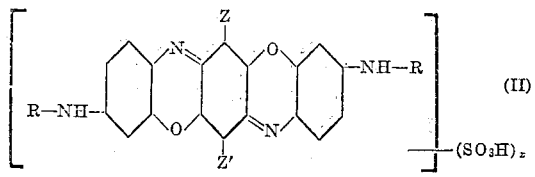

wherein Z, Z' and R have the same significance as above, while $x$ designates an undetermined number, probably not greater than 4.

It will be noted that my novel products differ from compounds in the prior art having the same general formula, in the structure of R. In the novel compounds of this invention R is the radical of a 1,3-benzazole, and is therefore characterized by a structure consisting of one homocyclic ring of 6 carbon atoms and of one heterocyclic 5-membered ring fused together. In the case of benzoxazole, benzthiazole and benzimidazole, this ring structure may be represented by the following formula:

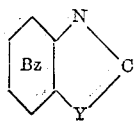

wherein Y stands for oxygen, sulfur, imino or substituted imino.

I have found that dioxazine dyestuffs as thus defined have improved affinity for cotton fiber compared to dioxazine dyestuffs which have other forms of R. Moreover, the dyeings thus obtained are fast to washing and to light and possess desirable, bright shades of blue and gray, good tinctorial strength, and improved exhausting qualities. The novel dyestuffs also possess improved solubility in acid, and may therefore be used on wool and silk; they may also be used on regenerated cellulose and nylon fibers.

In the general formula for the 1,3-benzazole complex above, the C-atoms of the Bz-ring may have their extranuclear valencies satisfied by the customary auxochromic substituents such as hydrogen, halogen, lower alkyl or lower alkoxy; the N-atom shown in the above azole ring has no extranuclear valencies in one tautomeric form, and carries a hydrogen atom in another tautomeric form; the C-atom of the azole ring may have its extranuclear valencies satisfied by hydrogen, OH, SH (in the enol form), O, S (in the keto form), alkyl, aryl, COOH, NH, N-alkyl or N-aryl; finally, the extra N-atom of the heterocyclic ring in the case of a benzimidazole may have its extra valency satisfied by hydrogen, alkyl (lower or higher) and aryl. Typical illustrations of these possible variations will be found in the table following the specific examples below.

The synthesis of my novel compounds may follow in general the prior practice of the art except for the choice of R. In some cases, however, I may include in this process a special aftertreatment step with anhydrous HCl (or NaCl+anhydrous $H_2SO_4$) at elevated temperature, as more fully illustrated in Example 1 below. I find that this step enhances the exhausting properties of the final dyestuff, and gives altogether greater tinctorial strength and washing fastness.

Considering now my process in greater detail, the synthesis of my novel dyestuffs may begin by reacting a nitro-halogen-benzene sulfonic acid, for instance 4-nitro-1-chlorobenzene-2-sulfonic acid, with a Bz-amino benzazole of the type $H_2N$-R, wherein R is the ralical of a 1,3-benzazole as above defined. The condensation is effected by the aid of an acid absorbing agent, and may be expressed by the following typical equation:

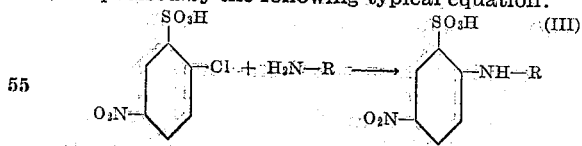

Condensation product III is then subjected to reduction, for instance by the aid of iron and acid, to convert the nitro group into an amino group. Two moles of the reduction product are then condensed in the usual manner with one mole of a benzoquinone selected from the group consisting of benzoquinone, its homologs and halogen derivatives, this condensation again being aided preferably by acid absorbing agents. The result is a compound of Formula I above.

Finally, the compound of Formula I above is subjected to ring closure by the aid of sulfuric acid, oleum or chlorosulfonic acid, which results in a dyestuff.

As a special added feature of this invention, I prefer in certain cases to treat the recovered dyestuff by warming it up in concentrated sulfuric acid (96 to 100% strength) containing a small quantity of sodium chloride, or into which dry HCl gas is fed in catalytic proportions. A small quantity of glacial acetic acid (1 to 2% by weight) may also be added.

Without any intent to limit this invention, the following examples are given to illustrate my preferred mode of operation. Parts mentioned are by weight.

*Example 1*

10 parts tetrachloro-benzoquinone (chloranil), 27 parts of 5(4'-amino-2'-sulfoanilino) - 2 - benzimidazolone (prepared as described in Recipe A below), 14 parts of anhydrous sodium acetate and 300 parts of alcohol are refluxed together for one or more hours. The mass is then filtered hot, washed with 60 parts of hot alcohol and dried. 34 parts of a dark condensation product is obtained which is nearly insoluble in alcohol. This product most probably corresponds to the formula

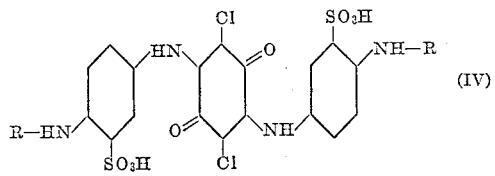

wherein R is the radical of benzimidazolone.

5 parts of this condensation product are now added slowly to 100 parts of fuming sulfuric acid (containing 20% SO₃) at 23 to 25° C., and kept there for three hours, whereupon the temperature is raised to 45° C. and kept there for one more hour. The reaction mixture is then added to ice, and the formed dyestuff is filtered off and washed with sodium chloride (10%) until free of mineral acidity. The wet filter cake is slurried in water, neutralized with soda ash, salted out, and filtered. After drying, the dye is obtained in good yield as a dark purple substance. It dyes animal and vegetable fibers in bright greenish blue tints of good light fastness.

Instead of raising the temperature to 45° C. in the last step above, the reaction mixture may be diluted with concentrated sulfuric acid to produce a monohydrate solution, or the dye may first be isolated, dried and then added to monohydrate. In the former case, the addition of some sodium chloride is preferable, whereas in the latter case the residual NaCl from the salting-out step is sufficient. In both cases, the reaction mixture is raised to 50 to 100° C. and kept there for about one hour, then drowned in ice and isolated in the above-described manner.

Noticeably redder shades of blue are obtained by the said treatment at the higher temperature. Similarly, slightly redder shades of blue are also obtained by substituting 30% oleum for the 20% oleum in the above example.

A similar dye is obtained if chlorsulfonic acid is used instead of the oleum above. For the final heating step, this dye may be redissolved in sulfuric acid monohydrate at a temperature from 65 to 100° C., and isolated in the same manner as above, resulting in similar improvement to the shade and qualities of the dye.

*Example 2*

5 parts of the dark condensation product as obtained in the first step in Example 1 is added to 100 parts of sulfuric acid mono-hydrate and the reaction mixture is heated to 150° C., kept there for one half hour, and then isolated as sodium salt, as in Example 1.

The dye is obtained in good yield as a dark powder. It dyes animal and vegetable fibers bluish gray tints of good light fastness.

Instead of monohydrate in this example, concentrated sulfuric acid (93 to 100%) may be employed with similar results.

*Example 3*

Example 1 is repeated, except that the tetrachlorobenzoquinone there employed is replaced by the equivalent quantity of toluquinone. The dye is obtained in good yield as a dark purple powder. It dyes animal and vegetable fibers bluish gray tints of good light fastness.

*Example 4*

Example 1 is repeated except that the tetrachlorobenzoquinone is replaced by the equivalent quantity of benzoquinone.

The dye is obtained in good yield as a dark powder. It dyes animal and vegetable fibers bluish gray tints of good light fastness.

*Example 5*

Example 1 is repeated, except that the tetrachloro-benzoquinone is replaced by an equivalent quantity of 2:5 dichloro-benzoquinone.

The dye is obtained in good yield as a dark powder. It dyes animal and vegetable fibers bright greenish blue tints of good light fastness.

*Example 6*

Example 1 is repeated except that the tetrachlorobenzoquinone is replaced by an equivalent quantity of tetrabromo-benzoquinone. The dye is obtained in good yield as a dark powder. It dyes animal and vegetable fibers blue tints of good light fastness.

*Recipe A*

This recipe shows the preparation of 5(4'-amino - 2' - sulfonanilino)-benzimidazolone employed as initial material in Example 1.

670 parts of 5-amino-benzimidazolone of the following formula:

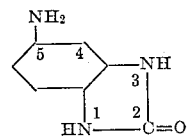

(made by reducing the corresponding nitrocompound, described in Ber. 45, 3243), 1244 parts of water and 1067 parts of para nitro-chlorobenzene-ortho-sulfonic acid are mixed together, and enough soda ash is added to make the reaction mixture slightly alkaline to Brilliant Yellow. This is followed by the addition of 88 parts of magnesium oxide, and the mass is then heated in a pressure vessel to 130 to 132° C. for 6 hours, then at 135 to 137° C. for 6 hours, and finally at 140 to 142° C. for 12 hours. The reaction mixture is now slurried in 1000 parts of additional water, made alkaline to Clayton Yellow paper with caustic soda, and filtered at 60° C.

The filtrate is acidified with an equal volume of hydrochloric acid, 20° Bé., cooled to room temperature, and the product is filtered off and dried.

The brown compound, obtained in good yield, is represented by the following formula

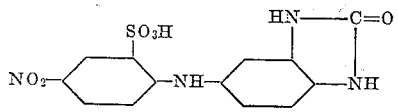

This substance dissolves readily in alkaline water solutions with a strong orange color and is again precipitated upon acidification.

In the next step of the procedure, 42 parts of the above nitro compound are added within one hour at the boil to a slurry of 50 parts of iron in 250 parts of water containing 10 parts of hydrochloric acid. After all the nitro body is added, the temperature is maintained for about 10 minutes longer at the boil, and the reaction mixture is then made alkaline to Clayton Yellow paper with a caustic soda solution, and filtered. The filtrate is cooled with ice and neutralized with acetic acid, and the precipitate is filtered off. The filter cake is washed with water and some acetone and then dried, giving the desired amino body in the form of a gray powder.

In a manner similar to the above examples, numerous other dyes of the dioxazine series may be prepared, by replacing the initial intermediate there employed by any other intermediate of the general formula

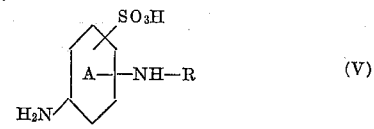

wherein the aryl radical marked A has at least one free ortho-position, and wherein R is the radical of a 1,3-benzazole, as above defined. The following table is typical of the intermediates which may be selected and of the shades obtained thereby. In all the cases of this table, chloranil was used to furnish the central component of the dioxazine system and the condensation was carried out as in the second paragraph of Example 1. The shades indicated are those obtainable on cotton by the resulting dyestuff. All the intermediates in this table may be made in a manner similar to Recipe A, but replacing the 5-amino-benzimidazolone by other o-, m-, or p-amino-benzazoles of formula $H_2N-R$. For this reason, the table below lists only the initial material of formula $H_2N-R$, it being understood that each of these was condensed with p-nitrochlorobenzene-o-sulfonic acid and then reduced as in Recipe A, resulting in an amino-diarylamine sulfonic acid of the above general formula to which the NH group above shown is attached in the benzo ring.

| Item No. | Initial $H_2N-R$ compound | Formula | Shade on cotton |
|---|---|---|---|
| 1 | 5-methyl-6-amino-2-benzimidazolone | | Blue. |
| 2 | 5-chloro-6-amino-2-benzimidazolone | | Do. |
| 3 | 6-amino-3-methyl-2-benzimidazolone | | |
| 4 | 6-amino-3-phenyl-2-benzimidazolone | | Greenish-blue. |
| 5 | 6-amino-3(2′, 5′-dichlorophenyl)-2-benzimidazolone | | Do. |
| 6 | 6-amino-2-benzimidazol-thione | | Do. |
| 7 | 5-amino-2-methyl-benzimidazole (from nitro-ortho-phenylene diamine and acetaldehyde). | | Dark blue. |
| 8 | 6-amino-2-methylbenzimidazole (from nitro-diacetyl-o-phenylene diamine). | | Greenish-blue. |
| 9 | 6-amino-benzimidazole | | Blue. |
| 10 | 6-amino-2-phenylbenzimidazole | | Dark blue. |

| Item No. | Initial H₂N—R compound | Formula | Shade on cotton |
|---|---|---|---|
| 11 | 5-amino-1,2-dimethylbenzimidazole | 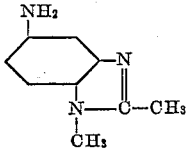 | Reddish-blue. |
| 12 | 5-amino-1-phenyl-2-methyl-benzimidazole | 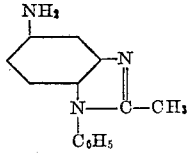 | Blue. |
| 13 | 5-amino-2-carboxy-benzimidazole | 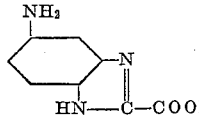 | Do. |
| 14 | 6-amino-2-orthochloro-phenylbenzimidazole | 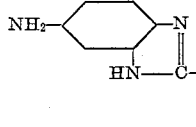 | Greenish-blue. |
| 15 | 6-amino-2-orthohydroxy-phenylbenzimidazole | 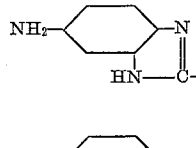 | Blue. |
| 16 | 6-amino-2-(2'-hydroxy-3'-carboxyphenyl)-benzimidazole | 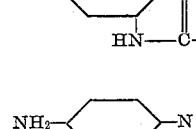 | Do. |
| 17 | 2,6-diamino-benzothiazole | 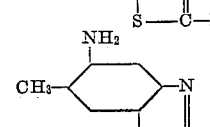 | Greenish-blue. |
| 18 | 2,5-diamino-6-methyl-benzothiazole | 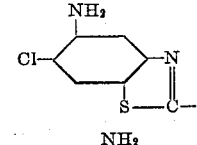 | Blue. |
| 19 | 2,5-diamino-6-chloro-benzothiazole | 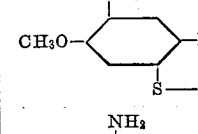 | Do. |
| 20 | 2,5-diamino-6-methoxy-benzothiazole | 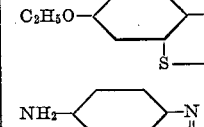 | Do. |
| 21 | 2,5-diamino-6-ethoxy-benzothiazole | 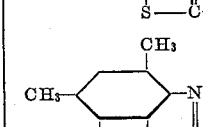 | Do. |
| 22 | 6-amino-2-acetamido-benzothiazole | 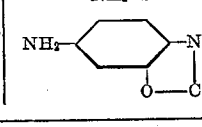 | Do. |
| 23 | 7-amino-4,6-dimethyl-2-acetamido-benzothiazole | | Do. |
| 24 | 6-amino-benzoxazolone |  | Bluish-gray. |

Further details on the preparation of the above intermediates of Formula V, including the preparation of the initial amino-benzazoles of formula NH₂—R, are given in my copending application, Serial No. 393,483 filed simultaneously herewith.

It will be understood that in the above table many of the compounds are capable of existing in two tautomeric forms: enol and keto. Only one of these has been shown in the table, for convenience. But no limitation is intended, as it will be readily apparent that either form may be employed.

Likewise, instead of condensing the said intermediates of Formula V with chloranil, they may be condensed with any of the other benzoquinone derivatives named in Examples 1 to 6, including in this term the toluquinones and higher homologs of the same.

I claim:

1. Dioxazine dyestuffs of the group obtainable by ring-closing, by the aid of an agent selected from the group consisting of sulfuric acid, oleum and chlorosulfonic acid, a quinone diamine of the formula

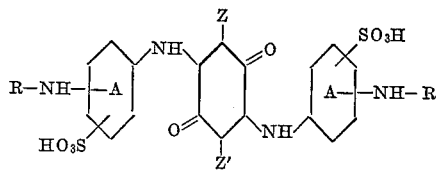

wherein each of the benzene radicals marked A has at least one free ortho position, and wherein Z and Z' individually represent a substituent selected from the group consisting of hydrogen, halogen and alkyl, while R is the radical of a 1,3-benzazole compound attached in the Bz ring.

2. Dioxazine dyestuffs of the group obtainable by causing a ring-closing agent selected from the group consisting of sulfuric acid, oleum and chlorosulfonic acid to react upon a quinone diamine of the formula

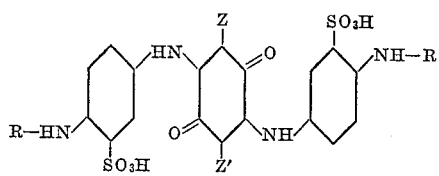

wherein Z and Z' represent substituents from the group consisting of hydrogen, halogen and alkyl, while R is the radical of a benzazole compound, attached in the Bz ring and selected from the group consisting of benzoxazole, benzthiazole, benzimidazole, their substitution derivatives and tautomers.

3. Dioxazine dyestuffs of the group obtainable by causing a ring-closing agent selected from the group consisting of sulfuric acid, oleum and chlorosulfonic acid to react upon a quinone diamine of the formula

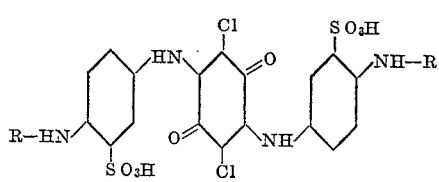

wherein R is the radical of a compound having the skeleton ring structure

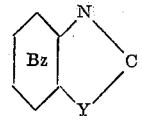

wherein Y stands for oxygen, sulfur or nitrogen, attached in the Bz ring and wherein the free valencies of the carbon and nitrogen atoms in the two rings are satisfied by attachment to members of the group consisting of hydrogen, halogen, alkyl, alkyloxy, aryl, hydroxy, mercapto, carboxy, oxygen, sulfur, and imino radicals.

4. Dioxazine dyestuffs of the group obtainable by causing a ring-closing agent selected from the group consisting of sulfuric acid, oleum and chlorosulfonic acid to react upon a quinone diamine of the formula

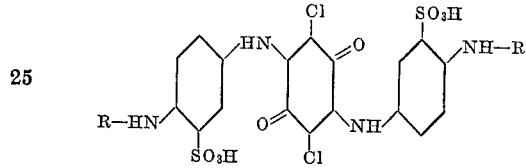

wherein R is the radical of 2-benzimidazolone attached in the Bz ring.

5. Dioxazine dyestuffs of the group obtainable by causing a ring-closing agent selected from the group consisting of sulfuric acid, oleum and chlorosulfonic acid to react upon a quinone diamine of the formula

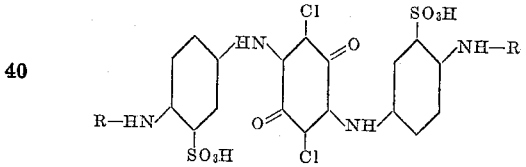

wherein R is the radical of 2-methyl-benzimidazole attached in the Bz ring.

6. Dioxazine dyestuffs of the group obtainable by causing a ring-closing agent selected from the group consisting of sulfuric acid, oleum and chlorosulfonic acid to react upon a quinone diamine of the formula

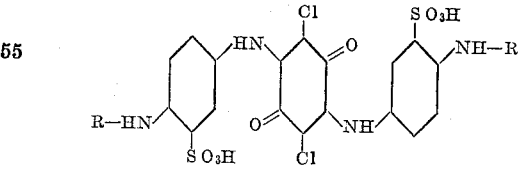

wherein R is the radical of 2-amino-thiazole attached in the Bz ring.

7. In the process of preparing a dioxazine dyestuff, the step which consists of reacting a benzoquinone with substantially two molal proportions of an amino-diaryl-amine sulfonic acid of the formula

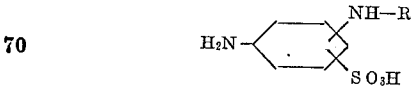

wherein at least one of the positions ortho to the NH₂ group is free, and wherein R is the radical of a 1,3-benzazole attached in the B₃ ring.

8. In the process of producing a dioxazine dyestuff, the steps comprising first reacting a benzoquinone with substantially two molal proportions of an amino-diaryl-amine sulfonic acid of the formula

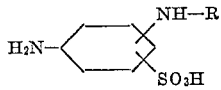

wherein at least one of the positions ortho to the NH₂ group is free, and wherein R is the radical of a 1,3-benzazole attached in the Bz ring, and then reacting upon the intermediate quinone-diamine thus formed with an agent selected from the group consisting of sulfuric acid, oleum and chlorosulfonic acid to close the rings adjacent to the quinone nucleus.

9. The process of producing a dioxazine dyestuff which comprises reacting tetrachloroquinone with substantially two molal ratios of an amino-diaryl-amine-sulfonic acid of the formula

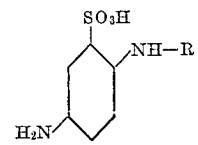

wherein R is the radical of a benzazole compound, attached in the Bz ring and selected from the group consisting of benzoxazole, benzthiazole, benzimidazole, their substitution derivatives and their tautomers, and then reacting upon the intermediate quinone-diamine thus formed with an agent of the group consisting of sulfuric acid, oleum and chlorosulfonic acid, whereby to close the rings adjacent to the quinone nucleus.

FRITHJOF ZWILGMEYER.

CERTIFICATE OF CORRECTION.

Patent No. 2,336,520.  December 14, 1943.

FRITHJOF ZWILGMEYER.

It is hereby certified that error appears in the printed specification of the above numbered patent requiring correction as follows: Page 1, second column, line 48, for "ralical" read --radical--; page 3, second column, line 28, after "formula" insert a period; line 29-30, strike out the words and period "to which the NH group above shown is attached in the benzo ring" and insert the same after "compound" and before the period, page 1, first column, line 20; and that the said Letters Patent should be read with this correction therein that the same may conform to the record of the case in the Patent Office.

Signed and sealed this 18th day of April, A. D. 1944.

Leslie Frazer (Seal)  Acting Commissioner of Patents.